(12) United States Patent
Dong et al.

(10) Patent No.: US 12,069,983 B2
(45) Date of Patent: Aug. 27, 2024

(54) LAWN MOWER

(71) Applicant: Globe (Jiangsu) Co., Ltd, Jiangsu (CN)

(72) Inventors: Jianhua Dong, Jiangsu (CN); Wanchun Jiao, Jiangsu (CN); Alexander Tyrling, Jonko (SE); Stefan La, Jonkoping (SE)

(73) Assignee: Globe (Jiangsu) Co., Ltd, Changzhou (CN)

( * ) Notice: Subject to any disclaimer, the term of this patent is extended or adjusted under 35 U.S.C. 154(b) by 592 days.

(21) Appl. No.: 17/283,248

(22) PCT Filed: Oct. 17, 2019

(86) PCT No.: PCT/CN2019/111715
§ 371 (c)(1),
(2) Date: Apr. 7, 2021

(87) PCT Pub. No.: WO2020/074011
PCT Pub. Date: Apr. 16, 2020

(65) Prior Publication Data
US 2021/0337727 A1 Nov. 4, 2021

(30) Foreign Application Priority Data
Oct. 9, 2018 (CN) .......................... 201811172312.5

(51) Int. Cl.
*A01D 34/69* (2006.01)
*A01D 34/00* (2006.01)
(Continued)

(52) U.S. Cl.
CPC .......... *A01D 34/69* (2013.01); *A01D 34/008* (2013.01); *A01D 34/6818* (2013.01); *A01D 2034/6843* (2013.01); *A01D 2101/00* (2013.01)

(58) Field of Classification Search
CPC ................ A01D 34/6818; A01D 34/69; A01D 2101/00; A01D 2034/6843
See application file for complete search history.

(56) References Cited

U.S. PATENT DOCUMENTS 2,879,074 A * 3/1959 Roberton ................ B60B 37/10
280/43
6,591,593 B1 7/2003 Brandon et al.
(Continued)

FOREIGN PATENT DOCUMENTS

CN 204037368 U 12/2014
CN 104908817 A 9/2015
(Continued)

OTHER PUBLICATIONS

Jiang, Drive arrangement and this drive arrangement's of adaptation lawn mower, Aug. 31, 2016, EPO, CN 205510937 U, Machine Translation of Description (Year: 2016).*
(Continued)

*Primary Examiner* — James A English

(57) ABSTRACT

A lawn mower includes a housing (1), a traveling wheel for supporting the lawn mower (100), a self-propelled motor for driving the traveling wheel, and a control circuit board (5) for controlling turning-on and turning-off of the self-propelled motor. The traveling wheel includes a pair of front traveling wheels (31) and a pair of rear traveling wheels (32), and the self-propelled motor includes a first self-propelled motor (41) and a second self-propelled motor (42). The lawn mower further includes a first control element and a second control element, the first control element is configured to control the control circuit board to turn-on or turn-off the first self-propelled motor, and the second control element is configured to control the control circuit board to turn-on or turn-off the second self-propelled motor. The
(Continued)

lawn mower can be driven in two-wheel drive or four-wheel drive as required, which is convenient to operate and maintain.

19 Claims, 7 Drawing Sheets

(51) Int. Cl.
*A01D 34/68* (2006.01)
*A01D 101/00* (2006.01)

(56) References Cited

U.S. PATENT DOCUMENTS

| | | | |
|---|---|---|---|
| 10,039,229 B2 * | 8/2018 | Wadzinski | A01D 69/00 |
| 2007/0186550 A1 * | 8/2007 | Tsukamoto | B60K 17/342 60/487 |
| 2011/0088362 A1 * | 4/2011 | Rosa | B60L 50/52 56/11.9 |
| 2016/0227704 A1 * | 8/2016 | Yamamura | G05D 1/0265 |
| 2019/0343040 A1 * | 11/2019 | Testolin | A01D 69/02 |
| 2020/0253114 A1 * | 8/2020 | Yan | A01D 69/06 |
| 2021/0064036 A1 * | 3/2021 | Muro | G05D 1/0272 |

FOREIGN PATENT DOCUMENTS

| | | | | |
|---|---|---|---|---|
| CN | 205510937 U | | 8/2016 | |
| CN | 205993119 U | | 3/2017 | |
| CN | 206264775 U | | 6/2017 | |
| CN | 107323452 A | | 11/2017 | |
| CN | 108243709 A | | 7/2018 | |
| CN | 108323305 A | | 7/2018 | |
| CN | 207594712 U | | 7/2018 | |
| CN | 108513790 A | * | 9/2018 | ............ A01D 34/68 |
| JP | 2007186174 A | * | 7/2007 | ............ B60K 17/10 |
| JP | 2008221861 A | * | 9/2008 | |
| WO | 2017198066 A1 | | 11/2017 | |
| WO | 2018137687 A1 | | 8/2018 | |

OTHER PUBLICATIONS

Chen et al., Multifunctional handle for hay mower and hay mower with multifunctional handle, Sep. 11, 2018, EPO, CN 108513790 A, Machine Translation of Description (Year: 2018).*
Hu et al., Hybrid power vehicle and driving control method thereof, Nov. 7, 2017, EPO, CN 107323452 A, Machine Translation of Description (Year: 2017).*
Iwaki et al., Hydraulic Type Continuously Variable Transmission for Traveling, Jul. 26, 2007, EPO, JP 2007-186174 A, Machine Translation of Description (Year: 2007).*
Takashi Yasui, All-Wheel Hydraulic Drive Riding-Type Lawn Mower, Sep. 25, 2008, EPO, JP 2008-221861 A, Machine Translation of Description (Year: 2008).*
Extended European Search Report of counterpart European Patent Application No. 19870559.2 issued on Nov. 8, 2021.
International search report of PCT Patent Application No. PCT/CN2019/111715 issued on Jan. 21, 2020.

* cited by examiner

LAWN MOWER

CROSS-REFERENCE TO RELATED APPLICATIONS

This application claims priority from Chinese patent application No. 201811172312.5, filed on Oct. 9, 2018, and entitled lawn mower, the entire contents of which are incorporated herein by reference.

TECHNICAL FIELD

The present disclosure relates to the technical field of garden machinery, and more particularly to a lawn mower.

BACKGROUND

A lawn mower is a common garden tool, and a traditional self-propelled lawn mower realizes self-propelled function by driving a front wheel or a rear wheel thereof through a speed reducer. When the self-propelled lawn mower needs to climb a slope during mowing grasses, a speed thereof will decrease or even the self-propelled lawn mower will stop. The reason for this is that a load of the self-propelled lawn mower becomes larger during climbing the slope, and a power of a self-propelled motor of the self-propelled lawn mower cannot meet the requirements for the load. However, if the power of the self-propelled motor of the self-propelled lawn mower is merely increased, when the self-propelled lawn mower travels on a flat ground, a required power for the self-propelled motor will be lower, and thus a maximum efficiency ratio of the self-propelled motor will not be achieved, thereby resulting in excessive loss and waste of energy.

In view of this, it is required to provide an improved lawn mower to solve the above problems.

SUMMARY

An objective of the disclosure is to provide a lawn mower with good energy saving effect and convenient operation.

In order to achieve the above objective, a lawn mower is provided according to the disclosure, which include a housing, a push rod connected with the housing, a traveling wheel for supporting the lawn mower, a self-propelled motor for driving the traveling wheel to self-propel, and a control circuit board for controlling turning-on and turning-off of the self-propelled motor, where the traveling wheel includes a pair of front traveling wheels and a pair of rear traveling wheels, and the self-propelled motor includes a first self-propelled motor and a second self-propelled motor, the lawn mower further includes a first control element and a second control element, the first control element is configured to control the control circuit board to turn-on or turn-off the first self-propelled motor, and the second control element is configured to control the control circuit board to turn-on or turn-off the second self-propelled motor.

As a further improvement of the disclosure, the push rod is U-shaped and include a first handle, a second handle and a third handle, the first and second handle extends backward and upward along a rear portion of the housing, and the third handle is connected with the first handle and the second handle and located at the top of the push rod.

As a further improvement of the disclosure, the first control element is a self-propelled pull rod arranged close to the third handle, the first self-propelled motor is turned-on if the self-propelled pull rod is pulled to enable the self-propelled pull rod to fit with the third handle, and the first self-propelled motor is turned-off if the self-propelled pull rod is released to enable the self-propelled pull rod to restore an initial position.

As a further improvement of the disclosure, the second control element is a push button arranged close to the top of the push rod, the push button is connected with the control circuit board, and the control circuit board is controlled to turn-on or turn-off the second self-propelled motor in a case that the push button is pushed.

As a further improvement of the disclosure, a self-propelled switch box is arranged on the push rod, and the push button is arranged on the self-propelled switch box.

As a further improvement of the disclosure, the second control element is arranged on the control circuit board and configured to detect a power of the first self-propelled motor and compare the power with a set value; and the control circuit board is configured to control the second self-propelled motor to turn-on if the power of the first self-propelled motor is higher than an upper limit of the set value, and control the second self-propelled motor to turn-off if the power of the first self-propelled motor is smaller than the lower limit of the set value.

As a further improvement of the disclosure, the upper limit of the set value is in a range from 300 W to 350 W, and the lower limit of the set value is in a range from 200 W to 250 W.

As a further improvement of the disclosure, the power of the first self-propelled motor is calculated by the second control element according to a current of the first self-propelled motor detected by the second control element.

As a further improvement of the disclosure, the second control element is an angular velocity sensor arranged on a wheel shaft of the traveling wheel, and the angular velocity sensor is configured to transmit current angular velocity information of the traveling wheel to the control circuit board, such that the control circuit board enables turning-on or turning-off of the second self-propelled motor according to the received angular velocity information.

As a further improvement of the disclosure, the control circuit board is configured to: calculate a current traveling speed of the lawn mower according to the received angular velocity information; compare the current traveling speed with a set value; control the second self-propelled motor to turn-on if the current traveling speed of the lawn mower is smaller than a lower limit of the set value; and control the second self-propelled motor to turn-off if the current traveling speed of the lawn mower is higher than an upper limit of the set value.

As a further improvement of the disclosure, the upper limit of the set value is in a range from 1.4 m/s to 2 m/s, and the lower limit of the set value is in a range from 0 to 1 m/s.

As a further improvement of the disclosure, the upper limit of the set value is 1.5 m/s, and the lower limit of the set value is 0.5 m/s.

As a further improvement of the disclosure, the lawn mower further includes a first speed reducing mechanism connected with the first self-propelled motor and a second speed reducing mechanism connected with the second self-propelled motor, and a clutch is arranged in each of the first speed reducing mechanism and the second speed reducing mechanism.

As a further improvement of the disclosure, the control circuit board is a printed circuit board (PCB), and the first self-propelled motor and the second self-propelled motor are electrically connected with the PCB respectively As a further improvement of the disclosure, the lawn mower further includes a power supply assembly arranged on the housing, and the first self-propelled motor and the second self-propelled motor are powered by the power supply assembly.

The disclosure has following beneficial effects. For the lawn mower of the disclosure, the first control element is set to control the turning-on or turning-off of the first self-propelled motor, and the second control element is set to control the turning-on or turning-off of the second self-propelled motor, such that when the operation requirements can be met by driving a single self-propelled motor, only the first self-propelled motor is controlled to operate; while when the operation requirements cannot be met by driving a single self-propelled motor, the second self-propelled motor is further controlled to operate to realize four-wheel drive. Moreover, the first self-propelled motor and the second self-propelled motor may be separately controlled, therefore, the effect of saving energy is not only achieved, but it is also convenient for operation and maintenance.

DETAILED DESCRIPTION OF EMBODIMENTS

In order to make objects, technical solutions and advantages of the disclosure clearer, the disclosure will be described in detail with reference to accompanying drawings and specific embodiments.

Figure 1:
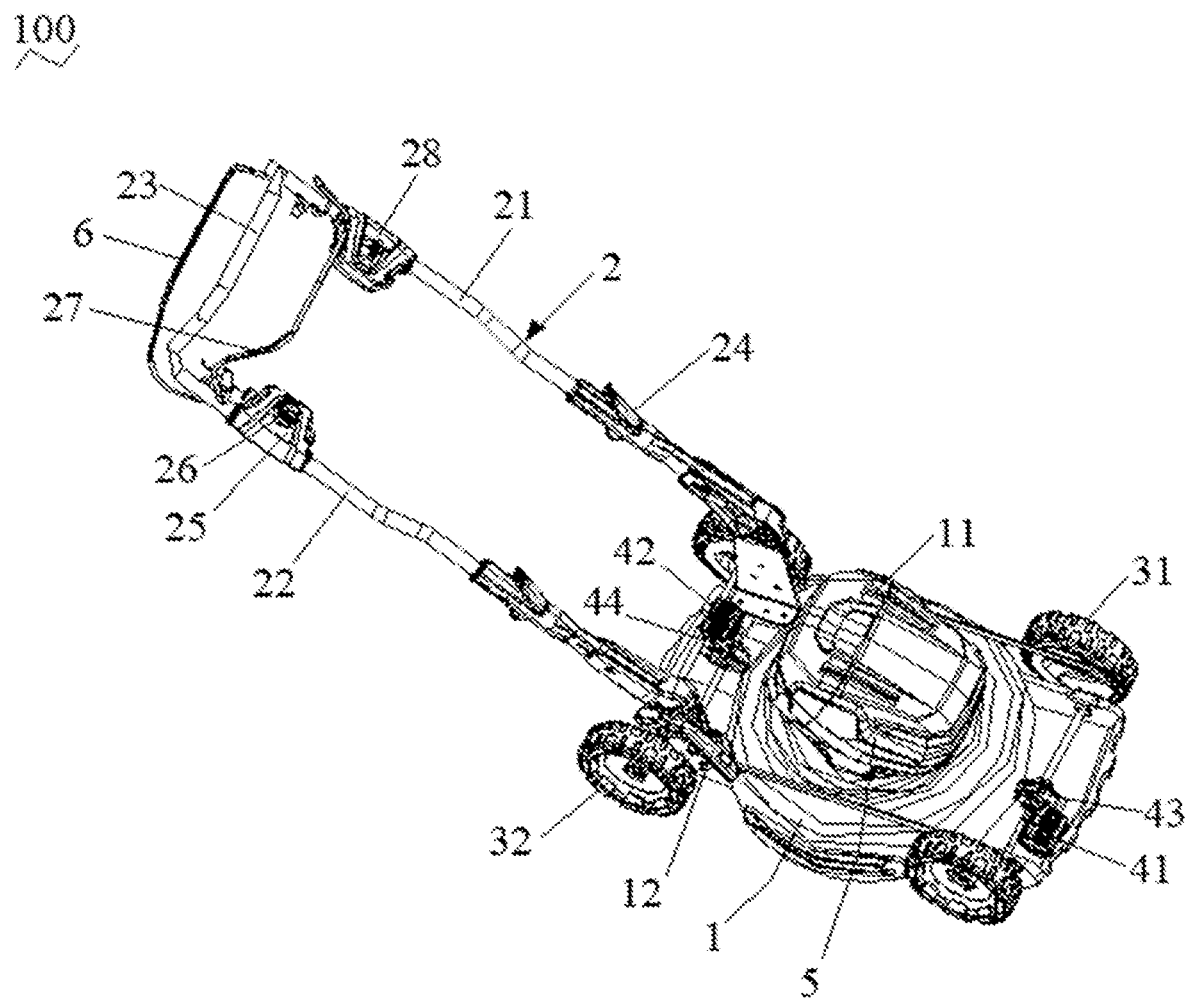
FIG. 1 is a schematic perspective view of a lawn mower according to a first embodiment of the disclosure.

Referring to FIG. 1, the disclosure provides a self-propelled lawn mower 100. The lawn mower 100 includes a housing 1, a push rod 2 connected to the housing 1, a traveling wheel supported the lawn mower 100, a self-propelled motor which is configured to drive the traveling wheel to self-propel, a control circuit board 5 which is configured to control turning-on and turning-off of the self-propelled motor and an enclosure which is assembled with the housing 1 (not shown).

A blade and a motor for driving the blade to rotate are arranged in the housing 1, a power assembly 11 is formed by the blade and the motor. The blade arranged at the bottom of the housing 1 is rotatable along a rotating shaft perpendicular to a ground to mow grasses on the ground. A power supply assembly (not shown) is also arranged in the housing 1, and the power supply assembly is configured to supply power to the lawn mower 100 to ensure that the grasses are mowed effectively.

The push rod 2 is U-shaped and include a first handle 21, a second handle 22, and a third handle 23. Specifically, the first handle 21 extends backward and upward along a rear portion of the housing 1, the third handle 23 is connected with the first handle 21 and the second handle 22, and the third handle 23 is located at the top of the push rod 2, such that an operator may stand behind the push rod 2 and grasp the third handle 23 of the push rod 2 to thereby operate the lawn mower 100. The first handle 21, the second handle 22 and the third handle 23 may be integrally formed, and may also be assembled and connected, which is not limited herein, as long as it is convenient to operate the lawn mower 100.

The first handle 21 and the second handle 22 are each provided with a folding structure 24, and the folding structure 24 is configured to adjust an angle of the push rod 2, thereby facilitating folding of the lawn mower 100. The housing 1 is also provided with a height adjustment assembly 12 for adjusting a height between the housing 1 and the ground to thereby adjust a mowing height.

A main knife switch box 25 is arranged a position on the second handle 22 close to the third handle 23. A turning-on switch (not shown), a turning-on button 26 and a return spring (not shown) are arranged in the main knife switch box 25. The turning-on switch is connected with the motor for turning-on the motor. The lawn mower 100 further includes a main knife switch pull rod 27 arranged close to the third handle 23, and the main knife switch pull rod 27 is arranged above the main knife switch box 25 and connected with the turning-on switch.

In a case that the blade of the lawn mower 100 is required to be turned-on, the turning-on button 26 is first pressed, the main knife switch pull rod 27 is then pulled to thereby enable the main knife switch pull rod 27 to fit with the third handle 23, enable the main knife switch pull rod 27 to pull the turning-on switch to turn-on the motor and drive the blade to rotate for performing a mowing process. In a case that the mowing process is finished, the main knife switch pull rod 27 is released, and the main knife switch pull rod 27 is restored to an initial position under the action of the return spring, and then the turning-on switch is turned-off and the blade stops rotating.

In order to turn-on the lawn mower 100 of the disclosure, it is required to press the turning-on button 26 first, and then pull the main knife switch pull rod 27. Through performing the above two actions, it is possible to prevent an accidental turning-on due to an inadvertently touch of the turning-on button 26, and thereby a safety factor of the lawn mower 100 is high.

The traveling wheel includes a pair of front traveling wheels 31 and a pair of rear traveling wheels 32. The self-propelled motor includes a first self-propelled motor 41 and a second self-propelled motor 42. The first self-propelled motor 41 is configured to drive the front traveling wheels 31 to self-propel. The second self-propelled motor 42 is configured to drive the rear traveling wheels 32 to self-propel. The first self-propelled motor 41 and the second self-propelled motor 42 are powered by the power supply assembly and electrically connected with the control circuit board 5 respectively. In the disclosure, the control circuit board 5 is a printed circuit board (PCB), and the first self-propelled motor 41 and the second self-propelled motor 42 are electrically connected to the PCB respectively, so that the turning-on and turning-off of the first self-propelled motor 41 and the second self-propelled motor 42 are controlled by the PCB.

It should be noted that the first self-propelled motor 41 is configured to drive the front traveling wheels 31 to self-propel, and the second self-propelled motor 42 is configured to drive the rear traveling wheels 32 to self-propel in the embodiment. Of course, the first self-propelled motor 41 can also be configured to drive the rear traveling wheels 32 to self-propel, and the second self-propelled motor 42 can be configured to drive the front traveling wheels 31 to self-propel, which is not limited herein.

The lawn mower 100 further includes a first speed reducing mechanism 43 connected with the first self-propelled motor 41 and a second speed reducing mechanism 44 connected with the second self-propelled motor 42. Clutches (not shown) are arranged in each of the first speed reducing mechanism 43 and the second speed reducing mechanism 44. The clutch of the first speed reducing mechanism 43 is configured to enable an output shaft of the first speed reducing mechanism 43 not to contact with a wheel shaft of each front traveling wheel 31 if the first self-propelled motor 41 is out of service, and the clutch of the second speed reducing mechanism 44 is configured to enable an output shaft of the second speed reducing mechanism 44 not to contact with a wheel shaft of each rear traveling wheel 32 if the second self-propelled motor 42 is out of service. Therefore, in a case that the first self-propelled motor 41 and/or the second self-propelled motor 42 are/is in a turned-off state, even if the lawn mower 100 is in moving state, the first self-propelled motor 41 and/or the second self-propelled motor 42 will not be reversely driven by the front traveling wheels 31 and/or the rear traveling wheels 32. The clutch is common in a prior art, and a specific structure and a power principle thereof may be referred to a patent application No. CN201721623687.X, it will not be described in detail herein.

In the disclosure, the first speed reducing mechanism 43 is arranged close to the first self-propelled motor 41, each of the first speed reducing mechanism 43 and the first self-propelled motor 41 is arranged close to the front traveling wheels 31. The second speed reducing mechanism 44 is arranged close to the second self-propelled motor 42, each of the second speed reducing mechanism 44 and the second self-propelled motor 42 is arranged close to the rear traveling wheels 32. With this arrangement, it is facilitated that the control circuit board 5 controls the turning-on or turning-off of the corresponding first self-propelled motor 41 and second self-propelled motor 42, and then drives the front traveling wheels 31 to self-propelled using the first reducing mechanism 43 and the rear traveling wheels 32 to self-propelled using the second reducing mechanism 44.

The lawn mower 100 further includes a first control element and a second control element. Specifically, the first control element is connected with the control circuit board 5 and configured to control the control circuit board 5 to turn-on or turn-off the first self-propelled motor 41, and the second control element is configured to control the control circuit board 5 to turn-on or turn-off the second self-propelled motor 42.

Specifically, the first control element is a self-propelled pull rod 6, which is arranged close to the top of the push rod 2 and the third handle 23. The first self-propelled motor 41 is turned-on, if the self-propelled pull rod 6 is pulled so as to fit the third handle 23. The self-propelled pull rod 6 returns to an initial position thereof and the first self-propelled motor 41 is turned-off, if the self-propelled pull rod 6 is released. Of course, in order to increase a safety of the lawn mower, it is also expected that additional actions can be performed besides pulling the self-propelled pull rod 6 to realize the turning-on and turning-off of the first self-propelled motor 41.

The main knife switch pull rod 27 is arranged on a side of the third handle 23, and the self-propelled pull rod 6 is arranged on the other side of the third handle 23. With this arrangement, when the lawn mower 100 is turned-on, the main knife switch pull rod 27 and the self-propelled pull rod 6 is simultaneously pulled to fit with the third handle 23, thereby facilitating grasping of the main knife switch pull rod 27 and the self-propelled pull rod 6 by the operator.

There are several manners for the second control element to control the turning-on or turning-off of the second self-propelled motor 42, and three of which will be described through three embodiments in detail in the following description, but it will not be limited herein.

Figure 2:
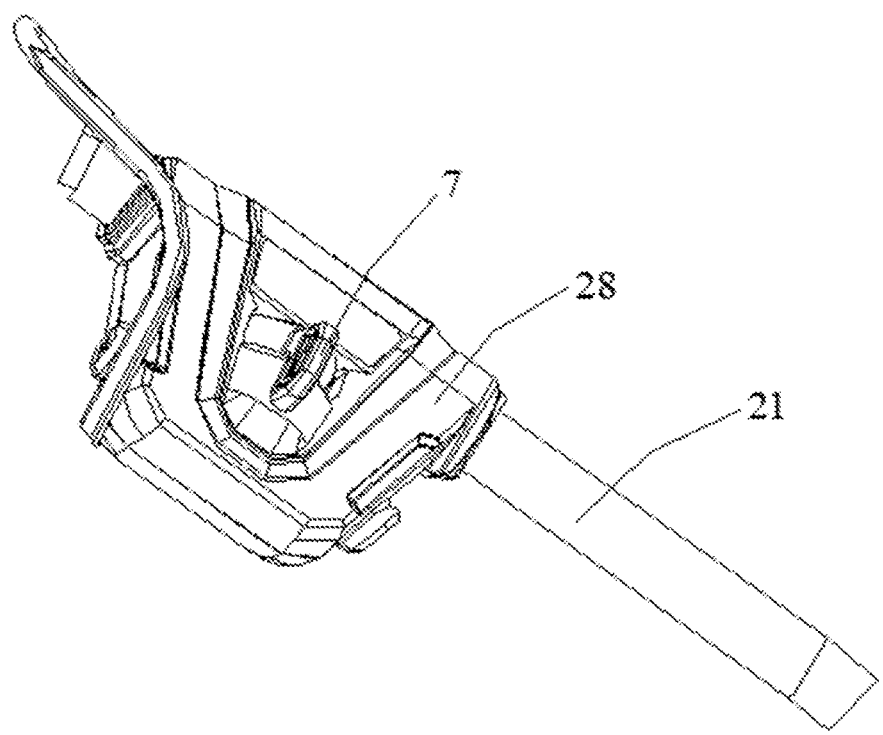
FIG. 2 is a schematic structural view of a self-propelled switch box and a push button of FIG. 1.
Figure 3:
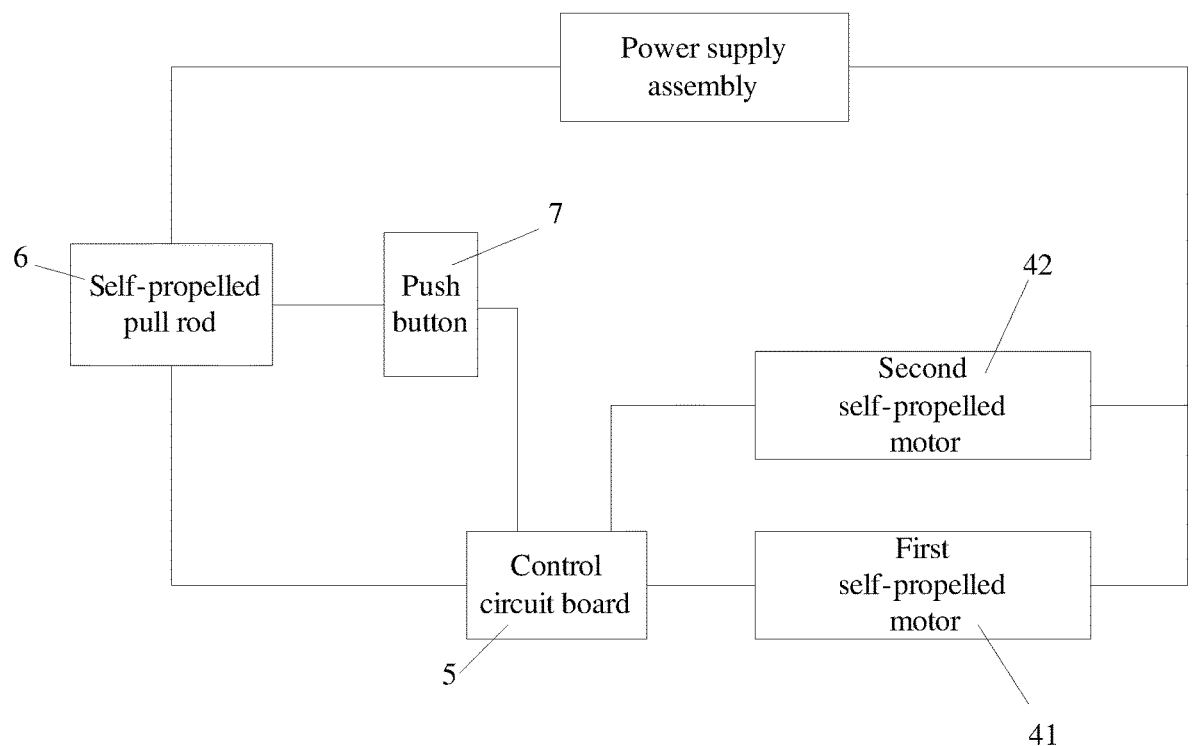
FIG. 3 is a circuit view illustrating an operation principle of the lawn mower shown in FIG. 1.

Referring to FIGS. 1 to 3, a lawn mower 100 is shown according to the first embodiment of the disclosure. In the embodiment, the second control element is a push button 7 arranged close to the top of the push rod 2, which is connected with the control circuit board 5. When the push button 7 is pushed backward or forward, the control circuit board 5 is controlled to correspondingly turn-on or turn-off the second self-propelled motor 42.

Specifically, the first handle 21 is provided with a self-propelled switch box 28, and the push button 7 is disposed on the self-propelled switch box 28. When the push button 7 is dialed by the operator forward (or backward), the control circuit board 5 controls the second self-propelled motor 42 to power on and thereby controls the turning-on of the second self-propelled motor 42. When the push button 7 is pushed backward (or forward), the control circuit board 5 controls the second self-propelled motor 42 to turn-off and thereby controls the turning-off of the second self-propelled motor 42.

In the embodiment, when the lawn mower 100 is traveling, the self-propelled pull rod 6 is pulled to enable the self-propelled pull rod 6 to fit with the third handle 23, in this case, the first self-propelled motor 41 is turned-on to drive the front traveling wheels 31 to self-propel through the first speed reducing mechanism 43, and the second self-propelled motor 42 is in a standby state. It should be noted that, in the embodiment, the premise that the second self-propelled motor 42 can be turned-on is that the first self-propelled motor 41 is in a turned-on state. That is to say, when the first self-propelled motor 41 is turned-off, the second self-propelled motor 42 will not be turned-on even if the push button 7 is in a turning-on state. Of course, in other embodiments, the operations of the first self-propelled motor 41 and the second self-propelled motor 42 may be independent of each other.

When the lawn mower 100 is traveling on a flat ground, the operation requirements can be met if the two front traveling wheels 31 are driven merely by the first self-propelled motor 41 to self-propel. In case of thick grasses and a large climbing resistance, the push button 7 is required to be pushed, so as to turn-on the second self-propelled motor 42 to thereby drive the rear traveling wheels 32 to self-propel through the second reducing mechanism 44, thereby realizing four-wheel drive. Conversely, when a resistance on the flat ground is low or the lawn mower 100 is traveling downhill, the second self-propelled motor 42 may be turned-off by using the push button 7, thereby effectively saving electric energy and prolonging the endurance of the lawn mower 100. Further, if a self-propelled speed of the lawn mower 100 is still too high in this case, the operator may turn-off (i.e., release) the self-propelled pull rod 6 to turn off the first self-propelled motor 41 to further save electric energy.

Figure 4:
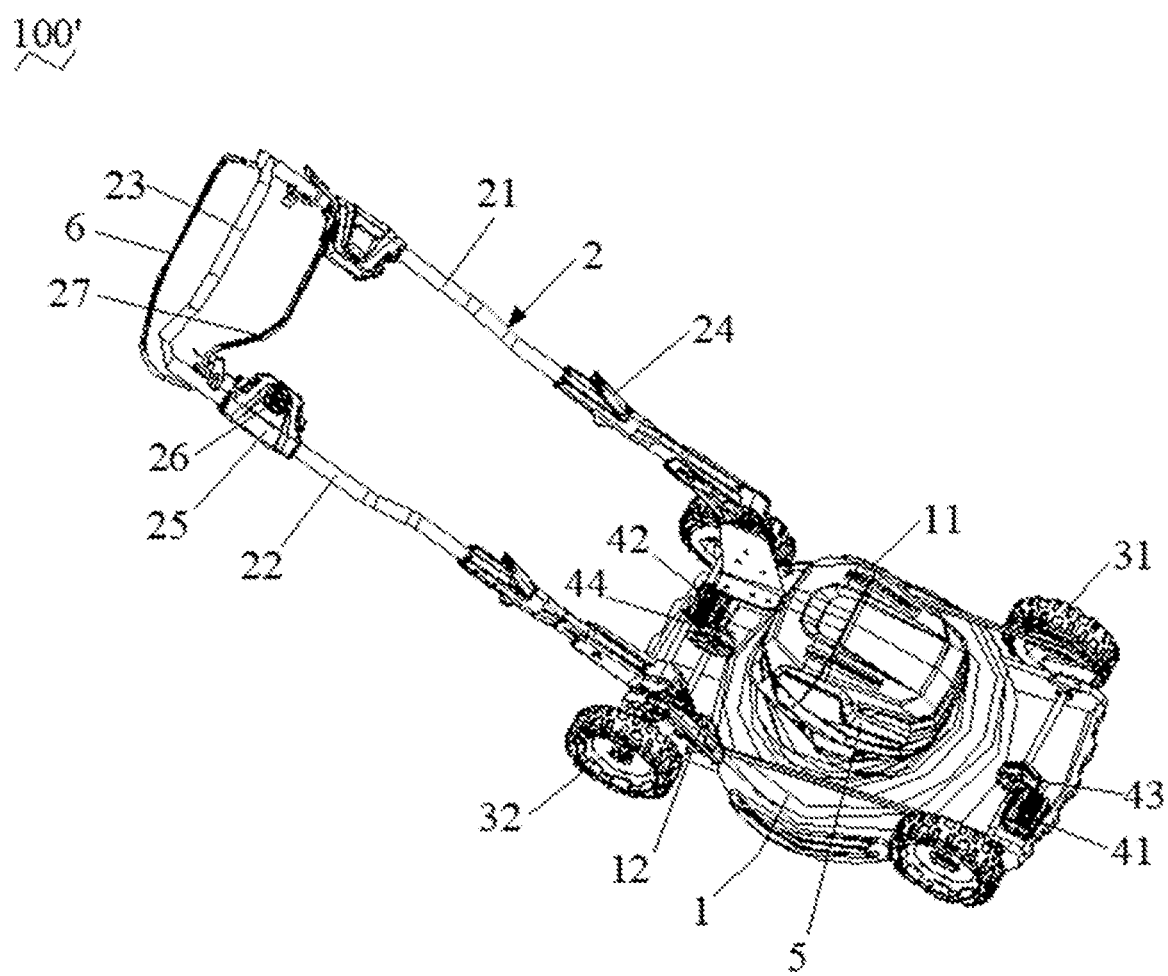
FIG. 4 is a schematic perspective view of a lawn mower according to a second embodiment of the disclosure.
Figure 5:
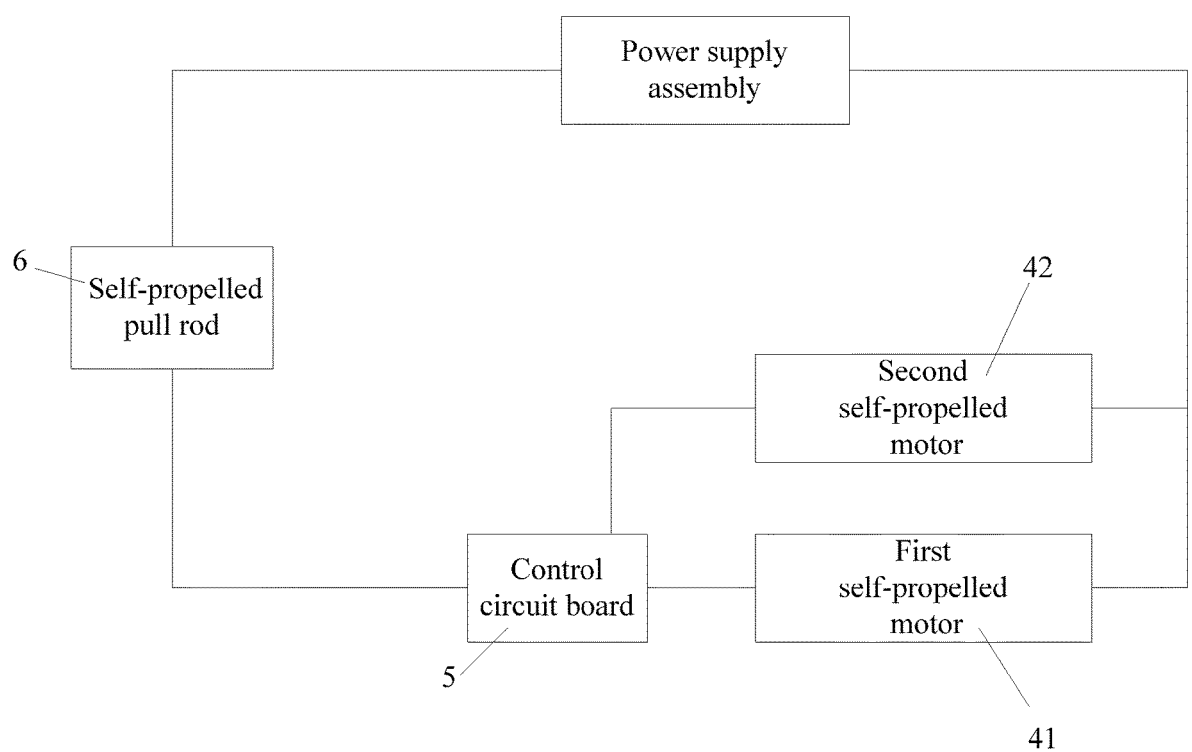
FIG. 5 is a circuit view illustrating an operation principle of the lawn mower shown in FIG. 4.

Referring to FIGS. 4 to 5, a lawn mower 100' is shown according to the second embodiment of the disclosure. In the embodiment, the second control element is a detection module (not shown), which is arranged on the control circuit board 5 and configured to detect a power of the first self-propelled motor 41, comparing the power with a set value to determine whether the second self-propelled motor 42 needs to be turned-on or turned-off.

Specifically, since there is a small change in a power supply voltage of the first self-propelled motor 41, the power of the first self-propelled motor 41 can be calculated by the detection module according to a current of the first self-propelled motor 41 detected by the detection module. Further, the detection module transmits the calculated power of the first self-propelled motor 41 to the control circuit board 5, and then the control circuit board 5 controls the second self-propelled motor 42 to turn-on or turn-off according to the received power of the first self-propelled motor 41. In the preferred embodiment, the control circuit board 5 controls the second self-propelled motor 42 to turn-on when the power of the first self-propelled motor 41 is higher than an upper limit of the set value, while the control circuit board 5 may control the second self-propelled motor 42 to turn-off when the power of the first self-propelled motor 41 is smaller than a lower limit of the set value. The upper limit of the set value may be in a range from 300 Watts (W) to 350 W, and preferably 320 W. The lower limit of the set value may be in a range from 200 W to 250 W, and preferably 240 W.

In the embodiment, when the lawn mower 100' is traveling, the self-propelled pull rod 6 is pulled to enable the self-propelled pull rod 6 to fit with the third handle 23, in this case, the first self-propelled motor 41 is turned-on to drive the front traveling wheels 31 to self-propel through the first speed reducing mechanism 43, and the second self-propelled motor 42 is in a standby state.

When the lawn mower 100' is traveling on a flat ground, the power of the first self-propelled motor 41 is small due to a small resistance, therefore, the operation requirements can be met if the two front traveling wheels 31 are driven merely by the first self-propelled motor 41 to self-propel.

In case of thick grasses and a large climbing resistance, a self-propelled load of the lawn mower 100' is large. In this case, if the detection module detects that the power of the first self-propelled motor 41 is large and exceeds the upper limit of the set value, the second self-propelled motor 42 is turned-on to drive the rear traveling wheels 32 to self-propel through the second speed reducing mechanism 44, thereby realizing four-wheel drive, in turn, reducing a running power of the first self-propelled motor 41 and avoiding overload of the first self-propelled motor 41.

When the lawn mower 100' is traveling downhill, the self-propelled load of the lawn mower 100' is small due to a small resistance. In this case, if the detection module detects that the power of the first self-propelled motor 41 is small and smaller than the lower limit of the set value, the second self-propelled motor 42 is turned-off to enable the efficiency of the first self-propelled motor 41 in a better state. Further, if the self-propelled speed of the lawn mower 100' is still too high in this case, the operator may turn-off (i.e., release) the self-propelled pull rod 6 to turn-off the first self-propelled motor 41, thereby saving electric energy and prolonging the endurance of the lawn mower 100'.

Figure 6:
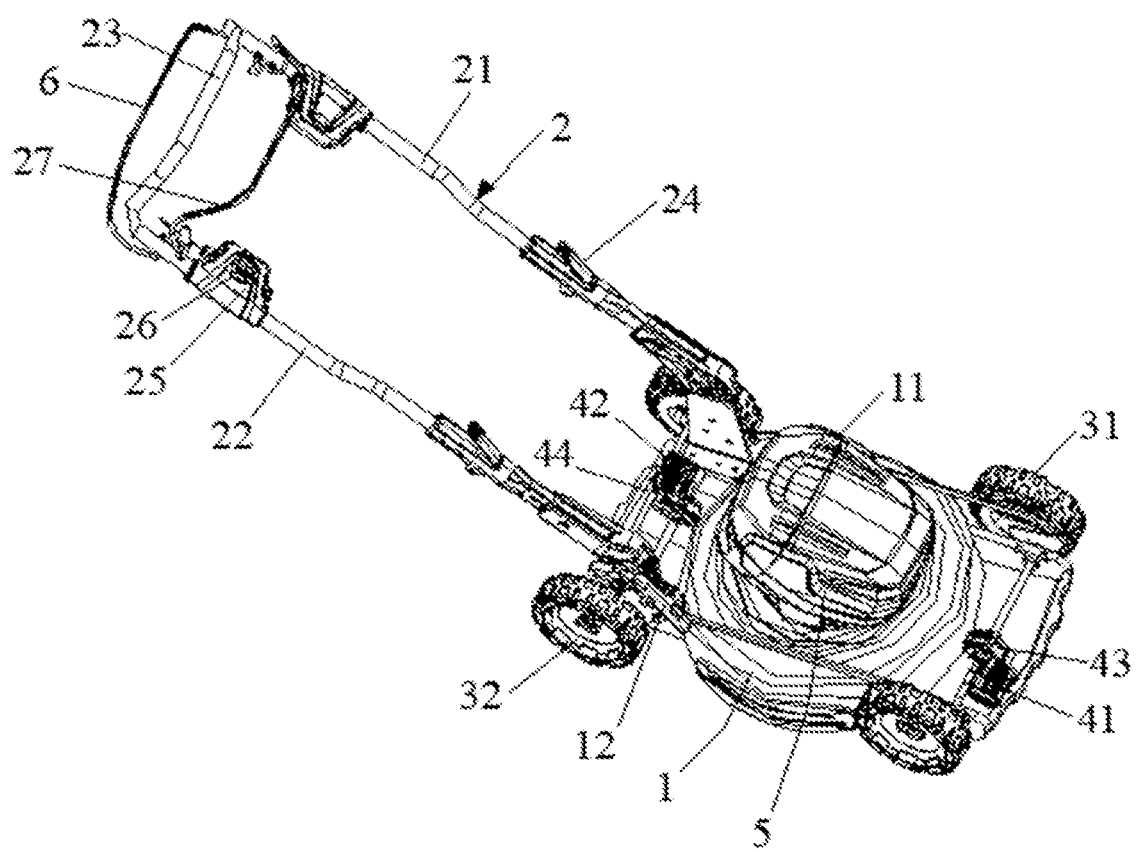
FIG. 6 is a schematic perspective view of a lawn mower according to a third embodiment of the disclosure.
Figure 7:
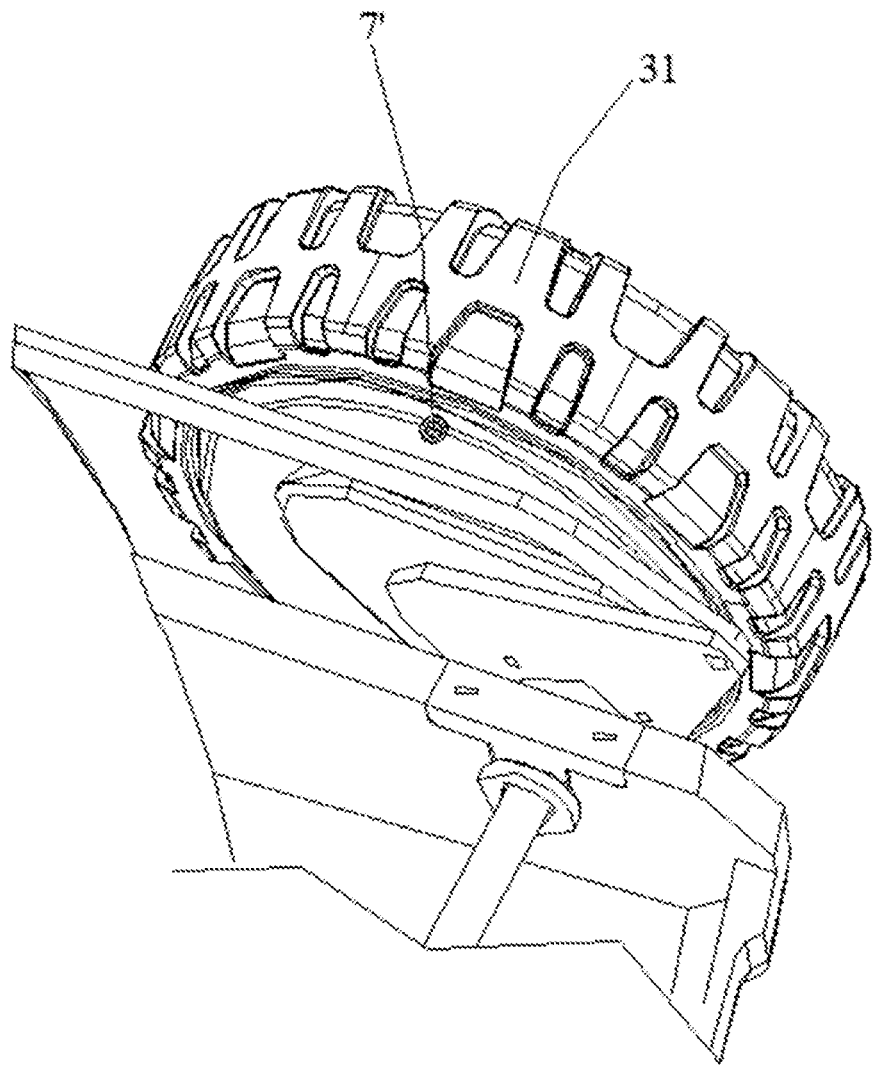
FIG. 7 is a schematic structural diagram of a front traveling wheel provided with an angular velocity sensor in FIG. 6.
Figure 8:
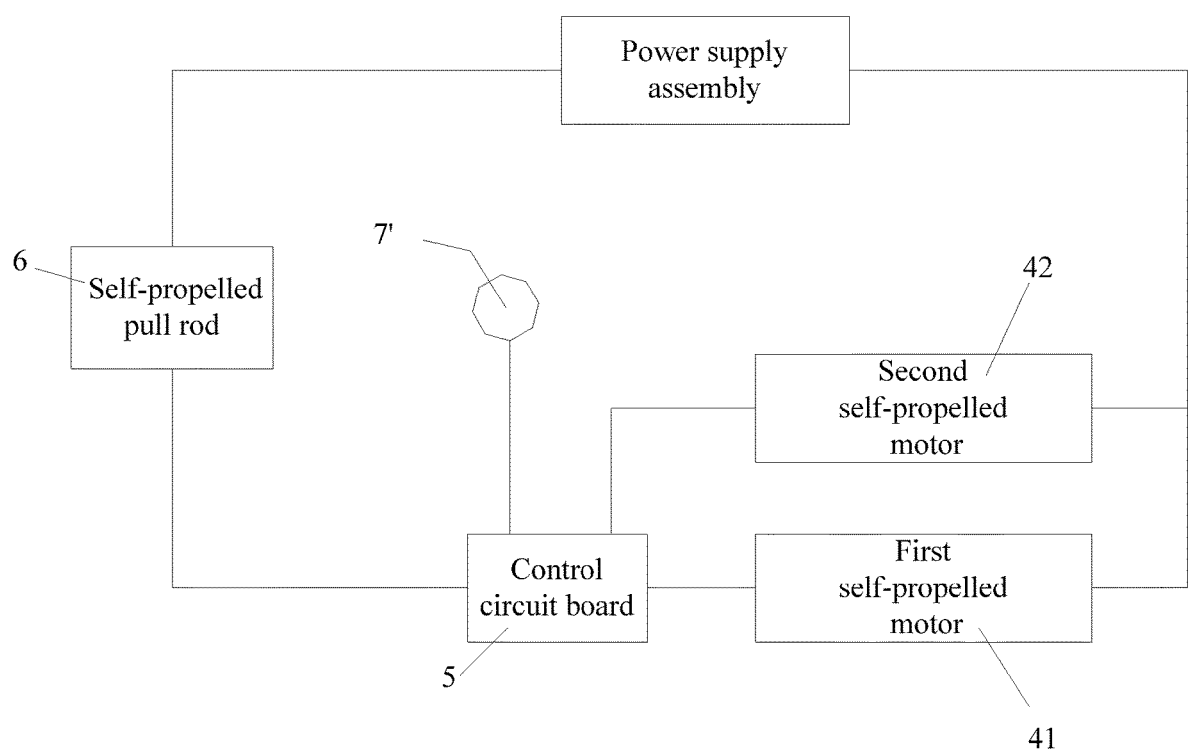
FIG. 8 is a circuit view illustrating an operation principle of the lawn mower shown in FIG. 6.

Referring to FIGS. 6 to 8, a lawn mower 100" is shown according to the third embodiment of the disclosure. In the embodiment, the second control element is an angular velocity sensor 7', which is arranged on the wheel shaft of each of the front traveling wheels 31 or the rear traveling wheels 32 and configured to transmit current angular velocity information of the corresponding traveling wheel to the control circuit board 5 in real time, and the control circuit board 5 determines whether the second self-propelled motor 42 needs to be turned-on or turned-off according to the received angular velocity information.

Specifically, since a size of the traveling wheels is fixed, the control circuit board 5 can calculate a current traveling speed of the lawn mower 100" according to the angular velocity information of the traveling wheels, compare the current traveling speed with a set value. Specifically, if the current traveling speed of the lawn mower 100" is smaller than a lower limit of a set value, the control circuit board 5 controls the second self-propelled motor 42 to turn-on; while if the current traveling speed of the lawn mower 100" is higher than an upper limit of the set value, the control circuit board 5 controls the second self-propelled motor 42 to turn-off. The upper limit of the set value is in a range from 1.4 meters per second (m/s) to 2 m/s, and preferably 1.5 m/s; The lower limit of the set value is in a range from 0 to 1 m/s, preferably 0.5 m/s.

In the embodiment, when the lawn mower 100" is traveling, the self-propelled pull rod 6 is pulled to enable the self-propelled pull rod 6 to fit with the third handle 23, in this case, the first self-propelled motor 41 is turned-on to drive the front traveling wheels 31 to self-propel through the first speed reducing mechanism 43, and the second self-propelled motor 42 is in a standby state.

When the lawn mower 100" is traveling on a flat ground, a traveling speed of the lawn mower 100" is between the upper limit and the lower limit of the set value, therefore, the operation requirements can be met if the two front traveling wheels 31 are driven merely by the first self-propelled motor 41 to self-propel.

In case of thick grasses and a large climbing resistance, the traveling speed of the lawn mower 100" is reduced. In this case, if the control circuit board 5 calculates that the traveling speed of the lawn mower 100" is reduced and smaller than the lower limit of the set value, the second self-propelled motor 42 is turned-on to drive the rear traveling wheels 32 to self-propel through the second deceleration mechanism 44, thereby realizing four-wheel drive, and enabling the traveling speed of the lawn mower 100" at a normal level.

When the lawn mower 100" is traveling downhill, a self-propelled speed of the lawn mower 100" is accelerated due to a small resistance. In this case, if the control circuit board 5 calculates that the traveling speed of the lawn mower 100" is faster and higher than the upper limit of the set value, the second self-propelled motor 42 is turned-off to enable the traveling speed of the lawn mower 100" at the normal level. Further, if the self-propelled speed of the lawn mower 100" is still too high in this case, the operator may turn-off (i.e., release) the self-propelled pull rod 6 to turn-off the first self-propelled motor 41, thereby saving electric energy and prolonging the endurance of the lawn mower 100".

Combined with the above three embodiments, the following conclusions can be drawn. When the operation requirements can be met by driving a single self-propelled motor, only the first self-propelled motor 41 operates to realize the self-propelled of the two front traveling wheels 31; while when the operation requirements cannot be met by driving a single self-propelled motor, the second self-propelled motor 42 further operates to realize four-wheel drive. The first self-propelled motor 41 and the second self-propelled motor 42 may be separately controlled, therefore, the effect of saving energy is not only achieved, but it is also convenient for operation and maintenance.

The enclosure may snap-fit with the housing 1, and is configured to cover the housing 1, the power assembly 11, the first self-propelled motor 41, the second self-propelled motor 42, the control circuit board 5 and the like, so as to prevent the power assembly, the power assembly 11, the first self-propelled motor 41, the second self-propelled motor 42 and the control circuit board 5 from being damaged by dust, water stains, etc., and to ensure that the lawn mowers 100, 100' and 100" can operate safely and stably, thereby prolonging the service life of the lawn mowers 100, 100' and 100".

In summary, for the lawn mowers 100, 100', and 100" of the disclosure, the first control element is set to control the turning-on or turning-off of the first self-propelled motor 41, and the second control element is set to control the turning-on or turning-off of the second self-propelled motor 42, such that when the operation requirements can be met by driving a single self-propelled motor, only the first self-propelled motor 41 is controlled to operate so as to realize two-wheel drive; while when the operation requirements cannot be met by driving a single self-propelled motor, the second self-propelled motor 42 may be further controlled to operate to realize four-wheel drive. Moreover, the first self-propelled motor 41 and the second self-propelled motor 42 may be separately controlled, therefore, the effect of saving energy is not only achieved, but it is also convenient for operation and maintenance.

The above embodiments are only used to illustrate but not limit the technical solutions of the disclosure. Although the disclosure has been described in detail with reference to preferred embodiments, it should be understood by those skilled in the art that the technical solutions of the disclosure can be modified or equivalently replaced without departing from the spirit and scope of the technical solutions of the disclosure.

What is claimed is:

1. A lawn mower, comprising:
   a housing;
   a push rod connected with the housing;
   a traveling wheel for supporting the lawn mower;
   a self-propelled motor for driving the traveling wheel to self-propel; and
   a control circuit board for controlling turning-on and turning-off of the self-propelled motor;
   wherein the traveling wheel comprises a pair of front traveling wheels and a pair of rear traveling wheels, the self-propelled motor comprises a first self-propelled motor configured to drive the pair of front traveling wheels to self-propel and a second self-propelled motor configured to drive the pair of rear traveling wheels to self-propel, the lawn mower further comprises a first control element and a second control element, the first control element is configured to control the control circuit board to turn-on or turn-off the first self-propelled motor, and the second control element is configured to control the control circuit board to turn-on or turn-off the second self-propelled motor; the lawn mower is configured to be switchable between a two-wheel drive operation state and a four-wheel drive operation state,
   wherein the lawn mower further comprises a power supply assembly arranged on the housing, and the first self-propelled motor and the second self-propelled motor are powered by the power supply assembly.

2. The lawn mower according to claim 1, wherein the push rod is U-shaped and comprises a first handle, a second handle and a third handle, the first and second handle extend backward and upward along a rear portion of the housing, and the third handle is connected with the first handle and the second handle and located at the top of the push rod.

3. The lawn mower according to claim 2, wherein the first control element is a self-propelled pull rod arranged close to the third handle, the first self-propelled motor is turned-on if the self-propelled pull rod is pulled to enable the self-propelled pull rod to fit with the third handle, and the first self-propelled motor is turned-off if the self-propelled pull rod is released to enable the self-propelled pull rod to restore an initial position.

4. The lawn mower according to claim 1, wherein the second control element is a push button arranged close to the top of the push rod, the push button is connected with the control circuit board, and the control circuit board is controlled to turn-on or turn-off the second self-propelled motor in a case that the push button is pushed.

5. The lawn mower according to claim 4, wherein a self-propelled switch box is arranged on the push rod, and the push button is arranged on the self-propelled switch box.

6. The lawn mower according to claim 1, wherein the second control element is arranged on the control circuit board and configured to detect a power of the first self-propelled motor and compare the power with a set value; and the control circuit board is configured to control the second self-propelled motor to turn-on if the power of the first self-propelled motor is higher than an upper limit of the set value, and control the second self-propelled motor to turn-off if the power of the first self-propelled motor is smaller than the lower limit of the set value.

7. The lawn mower according to claim 6, wherein the upper limit of the set value is in a range from 300 W to 350 W, and the lower limit of the set value is in a range from 200 W to 250 W.

8. The lawn mower according to claim 6, wherein the power of the first self-propelled motor is calculated by the second control element according to a current of the first self-propelled motor detected by the second control element.

9. The lawn mower according to claim 1, wherein the second control element is an angular velocity sensor arranged on a wheel shaft of the traveling wheel, and the angular velocity sensor is configured to transmit current angular velocity information of the traveling wheel to the control circuit board, such that the control circuit board enables turning-on or turning-off of the second self-propelled motor according to the received angular velocity information.

10. The lawn mower according to claim 9, wherein the control circuit board is configured to: calculate a current traveling speed of the lawn mower according to the received angular velocity information; compare the current traveling speed with a set value; control the second self-propelled motor to turn-on if the current traveling speed of the lawn mower is smaller than a lower limit of the set value; and control the second self-propelled motor to turn-off if the current traveling speed of the lawn mower is higher than an upper limit of the set value.

11. The lawn mower according to claim 10, wherein the upper limit of the set value is in a range from 1.4 m/s to 2 m/s, and the lower limit of the set value is in a range from 0 to 1 m/s.

12. The lawn mower according to claim 11, wherein the upper limit of the set value is 1.5 m/s, and the lower limit of the set value is 0.5 m/s.

13. The lawn mower according to claim 1, wherein the lawn mower further comprises a first speed reducing mechanism connected with the first self-propelled motor and a second speed reducing mechanism connected with the second self-propelled motor, and a clutch is arranged in each of the first speed reducing mechanism and the second speed reducing mechanism.

14. The lawn mower according to claim 1, wherein the control circuit board is a printed circuit board (PCB), and the first self-propelled motor and the second self-propelled motor are electrically connected with the PCB respectively.

15. The lawn mower according to claim 2, wherein the first handle and the second handle are each provided with a folding structure, and each folding structure is configured to adjust an angle of the push rod; and wherein the housing is provided with a height adjustment assembly for adjusting a height between the housing and the ground.

16. The lawn mower according to claim 3, wherein a main knife switch box is arranged a position on the second handle close to the third handle, a turning-on button is arranged in the main knife switch box; the lawn mower further includes a main knife switch pull rod arranged close to the third handle and above the main knife switch box;

wherein a blade of the lawn mower is configured to be turned-on by first pressing the turning-on button and then pulling the main knife switch pull rod.

17. The lawn mower according to claim 16, wherein the main knife switch pull rod is arranged on a side of the third handle, and the self-propelled pull rod is arranged on the other side of the third handle.

18. The lawn mower according to claim 1, wherein in response to being subject to a first self-propelled load, the lawn mower is switched to the two-wheel drive operation state, and in response to being subject to a second self-propelled load which is larger than the first self-propelled load, the lawn mower is switched to the four-wheel drive operation state.

19. The lawn mower according to claim 18, wherein the second self-propelled motor is only enabled to be turned-on when the first self-propelled motor is in a turned-on state.

* * * * *